United States Patent

[11] 3,542,111

[72] Inventors: Frederick J. Kovac, Bath; Grover W. Rye, Cuyahoga Falls; Kevin B. O'Neil, Akron, Ohio
[21] Appl. No.: 789,047
[22] Filed: Dec. 31, 1968
[45] Patented: Nov. 24, 1970
[73] Assignee: The Goodyear Tire & Rubber Company Akron, Ohio a corporation of Ohio

[54] COMBINATION OF INGREDIENTS IN BIAS-BELTED TIRE
17 Claims, 4 Drawing Figs.
[52] U.S. Cl. .................................................. 152/359
[51] Int. Cl. .................................................. B60c 1/00
[50] Field of Search ........................................... 152/359

[56] References Cited
UNITED STATES PATENTS
3,311,152  3/1967  Marzocchi et al. ............ 152/359
3,315,722  4/1967  Marzocchi et al. ............ 152/359

Primary Examiner—Arthur L. La Point
Assistant Examiner—Richard A. Bertsch
Attorneys—F. W. Brunner and Jack M. Young ABSTRACT: A bias-belted tire having the herein specified tire belt warp cord physical characteristics, herein called combination of ingredients, especially when used in a bias-belted tire with fiberglass belt cords, polyester carcass cords, and specified cord angles and relationships.

Patented Nov. 24, 1970
3,542,111
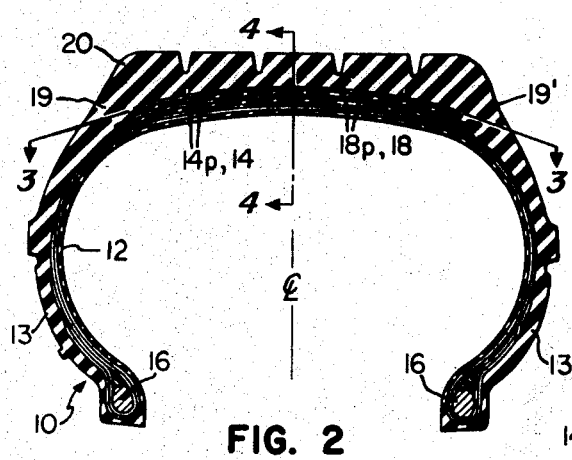
FIG. 2
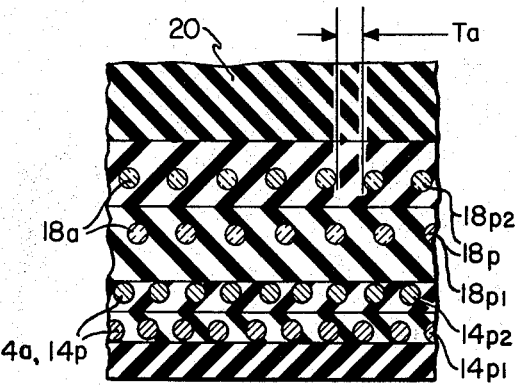
FIG. 4
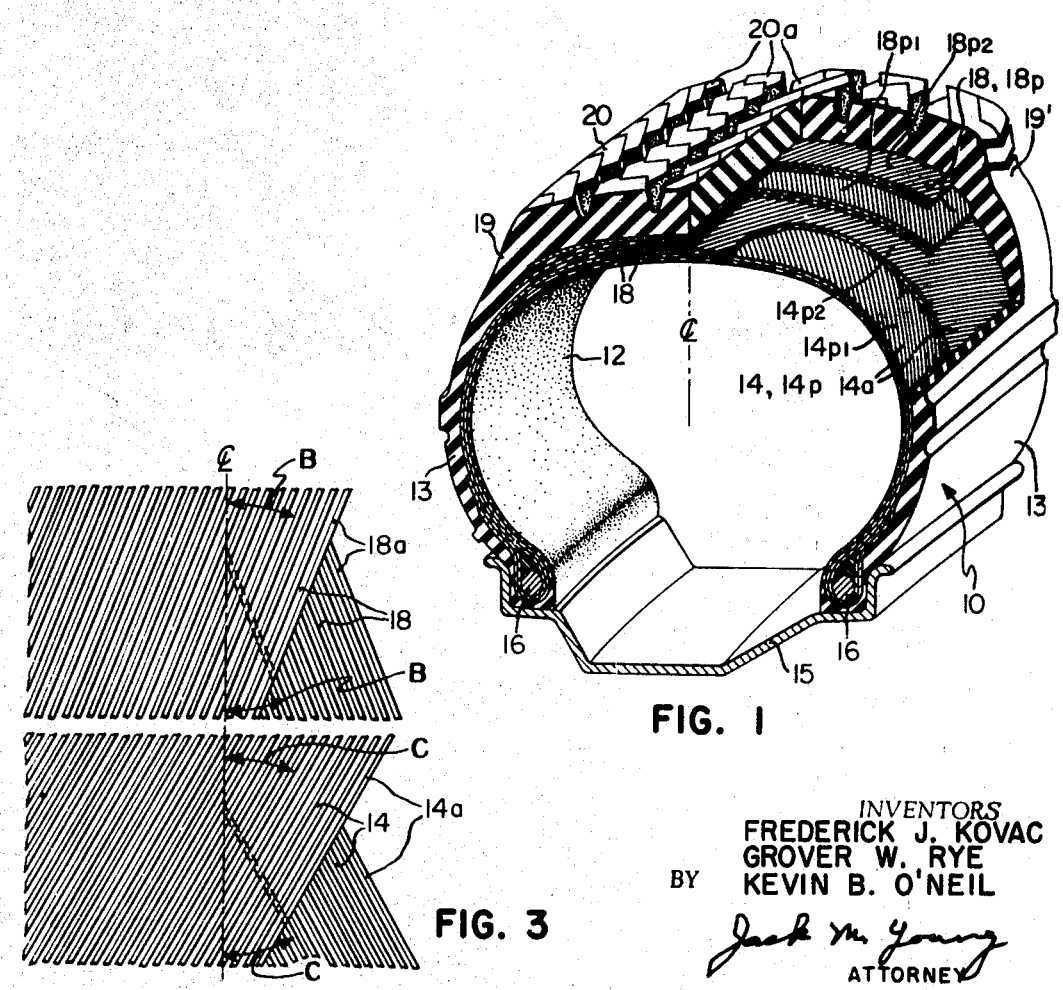
FIG. 3
FIG. 1
INVENTORS
FREDERICK J. KOVAC
GROVER W. RYE
BY KEVIN B. O'NEIL
ATTORNEY

COMBINATION OF INGREDIENTS IN BIAS-BELTED TIRE

The foregoing abstract is not to be taken as limiting the invention of this application, and in order to understand the full nature and extent of the technical disclosure of this application, reference must be made to the accompanying drawings and the following detailed description.

BACKGROUND AND SUMMARY OF THE INVENTION

The present invention relates to pneumatic tires, and to woven fabric usable as a ply in such tire; and relates especially to bias-belted tires.

A description of the prior art bias angle tires and radial ply tires as they relate to the presently disclosed bias-belted tires has been made in detail in the "Detailed Description of the Preferred Embodiments" hereinafter so that the development of the tire art may be more readily understood by reference to similar components in the drawing by reference numbers.

This invention obtains a superior quality pneumatic tire in a bias-belted tire by combining the desirable features of a bias angle tire and a radial ply tire.

An object of the present invention is to obtain a superior quality pneumatic tire by using a bias-belted tire construction.

Another object of the present invention is to provide a superior quality bias-belted tire having the herein specified tire belt cord physical characteristics, herein called combination of ingredients.

Another object of the present invention is to provide a superior quality bias-belted tire with fiberglass belt cords, polyester carcass cords, and/or specified cord angles and relationships.

Another object of the present invention is to provide a superior quality pneumatic tire having a bias-belted construction with (1) excellent treadwear; (2) improved traction by keeping the tread grooves open; (3) excellent high speed performance and durability; (4) a cool running tire; (5) bruise resistance, ride, stability, handling, cornering, and road holding characteristics; (6) low rolling resistance; etc.

These and other objects of the present invention will become more fully apparent by reference to the appended claims as the following detailed description proceeds in reference to the accompanying drawings.

BRIEF DESCRIPTION OF THE DRAWINGS

In the drawings:

FIG. 1 is a perspective view of a cross section (with parts broken away) of bias-belted tire of this invention mounted upon a rim and shown in its inflated position;

FIG. 2 is a radial, cross-sectional view (with parts broken away) of the tire of the present invention removed from the rim;

FIG. 3 is a radially inward view taken generally along the line 3—3 of FIG. 2 showing the relationship of the cord angles in the carcass and belt; and FIG. 4 is a sectional view taken generally along the line 4—4 in FIG. 2 along the centerline of the tire showing the relationship between the component tire parts.

DETAILED DESCRIPTION OF THE PREFERRED EMBODIMENTS

In FIG. 1, bias-belted pneumatic tire 10 includes internally reinforced carcass 12 including carcass cord layer 14 having a plurality of carcass plies 14p (here shown as two in number as plies 14p1 and 14p2), which plies are wrapped around inextensible bead members 16 located at wheel rim 15 during use of the tire; and includes circumferential belt 18, comprising a plurality of circumferential belt or breaker plies 18p in carcass 12 beneath tread 20.

Each ply 14p or 18p is made of a rubberized fabric composed respectively of a plurality of parallel tire cords 14a or 18a disposed side by side to form the tire fabric, and coated on each side with a thin layer of rubber carcass stock.

Carcass plies 14p are so arranged that generally parallel carcass cords 14a connect, and extend from, one bead 16 of tire 10 to the other spaced apart bead 16 with cords 14a of respective plies 14p crossed and extending in opposite directions.

A plurality of superimposed breaker of belt plies 18p, bias cut with belt cords 18a of adjacent plies crossed, are positioned in the crown of tire 10, circumferentially around carcass plies 14p, bisected by tire centerline CL, and beneath ground-engaging tire tread 20 having thereon suitable tread elements 20a, such as a pattern of grooves, ridges, etc.

After receiving shaped carcass 12 and applied belt 18 and tread 20 on a tire-building machine, tire 10 is cured in a mold in the usual manner. Then, finished bias-belted tire 10 in FIGS. 1 and 2 has carcass 12 with sidewalls 13, bead members 16, shoulders 19 and 19', and tread 20.

Cords 14a and 18a may be made of any suitable filamentary material. For example, cords 14a and 18a of plies 14p and 18p may be made of a synthetic textile material, such as rayon, nylon or polyester. Also, cords 18a in plies 18p may be made of any of the last mentioned synthetic materials; any suitable high modulus and relatively inextensible material, such as, metallic wire, such as steel wire, or (nonmetallic) fiber glass; or any combination of any two or more of these materials, such as in a merged cord.

Tire 10 has been found to have an especially desirable combination of advantages when carcass cords 14a are polyester material and cords 18a are a singles or other type cord of fiberglass filaments (nonmetallic filaments) with each cord being formed of a plurality of extruded, continuous filaments, and especially when the hereinafter mentioned preferred cord angles are used.

The word "cord", as used herein, is used in the terminology of the tire trade when referring to carcass cords 14a, belt cords 18a, cord angle B or C, and cord or cords generically; and the word "cord" thus used is intended to include: (1) in the terminology of the textile trade plied yarn; singles yarn with "0", low, medium, or high twist; a cord or cable made of twisted or plied yarns; etc., and (2) in the terminology of the metal trade wire filament, cord, cable, etc. For example, polyester carcass cords 14a are usually true textile cords, while fiberglass belt cords 18a generally take the form of singles yarn or plied yarn with "0" or low twist so as to take maximum advantage of the characteristics of fiberglass filaments.

A superior quality tire, here called and described as bias-belted tire 10, is obtained by combining the desirable features of a bias-angle tire and a radial ply tire.

A bias-angle tire has multiple carcass plies of parallel cords placed at opposed angles, and symmetrical with the tire centerline with each ply extending from bead to bead through the carcass under the tire tread. These are similar to only two bias carcass plies 14p (with belt 18 omitted) under tread 20 in tire 10 in FIG. 1. This bias-angle tire deflects under load in the tire footprint area to behave as a flexible membrane and to assume a smaller radius there as deflected under load with the result that in the footprint area the plies shorten and the cord angles in the plies change. This action also occurs in the tire sidewall and is called pantographing. Pantographing is desirable in the tire sidewall since it gives an improved ride by providing bump and vibration damping properties; but is not desirable in the tread since it distorts the tread elements, wears off tread by a rubbing action with the road, and increases temperature buildup.

A radial ply tire has one or more carcass plies going substantially radially from bead to bead with a belt of multiple plies of parallel cords banding the carcass under the tire tread. This belt is similar to belt 18 (without carcass plies 14p) in tire 10 in FIG. 1. This radial ply tire can be visualized as the belt acting like a fixed circumference steel band rolling on the pavement. Its circumference would be the same whether it is circular or is deformed into elliptical or semielliptical shape. Thus, the revolutions per mile are relatively independent of load or inflation pressure. Since the tread area will not pantograph, the fixed circumference hoop (belt) of a radial ply tire gives tread stability resulting in improved traction and tread wear. The sidewalls of a radial ply tire will not pantograph, due to its carcass configuration.

Bias-belted tire 10 combines the flexible membrane and fixed circumference hoop type of operation, i.e., maintaining pantographing in the sidewall and eliminating pantographing in the tread. Principles involved in constructing such a tire can be divided into (a) necessary components and (b) degree of restriction. The components to achieve this desired combination necessitates the use of bias-angle carcass 12 and belt 18. Bias-angle carcass 12 permits pantographing action in the sidewalls 13 to give a good ride by effective vibration and bump damping, and to give sidewall strength and stability. Belt 18 provides an inextensible and incompressible hoop structure which stabilizes or stiffens tread 20 by minimizing pantographing in the tread area to minimize tread element 20a movement and squirm so as to obtain: (1) excellent treadwear; (2) improved traction by keeping the tread grooves 20a open; (3) excellent high speed performance and durability; (4) a cool running tire; (5) good bruise resistance, ride, stability, handling, cornering, and road holding characteristics; (6) low rolling resistance; etc.

The degree of restriction in tire 10 controls the behavior of the tire components. The degree of restriction is dependent on inflated tire characteristics, the relationship of components, and the materials of construction.

As to the inflated tire characteristics, when the tire is inflated to a normal operating pressure, belt 18 will provide a substantial restraint on the carcass 12. This restraint is with respect to the increase, as tire 10 is inflated, of the radial dimensions of carcass 12 as measured at circumferential centerline CL thereof and over a substantial area of carcass 12, extending from centerline CL and laterally of tire tread 20. In other words, if tire 10 were manufactured identically in all respects to bias-belted tire 10, but without belt 18, carcass 12 of such tire would, when the tire was inflated, increase in such radial dimensions by amounts substantially greater than would carcass 12 of tire 10 having belt 18. It will be apparent that in bias-belted tire 10 belt 18 will be required to carry a very substantial portion of the ring stresses present in inflated tire 10.

The relationship of the tire components is primarily characterized by carcass cord angle C, belt cord angle B and the differential of these angles. Cord angles B and C are measured relative to the equatorial plane containing centerline CL, or relative to this centerline CL. Carcass cord 14a angle C in each carcass ply 14p should be maintained between 25° and 45° and belt cord 18a angle B in each belt ply 18p between 5° and 35° with belt cord 18a angle B even being desirably limited to be between 10° and 30°. In addition, angle C of carcass cords 14a should be at least 5° greater than belt angle B of belt 18. The preferred angle C of carcass cords 14a is 28°—40° and the preferred belt cord angle B of belt 18 if 18°—28°. As to belt 18, under 5° belt cord angle C makes a tire difficult to manufacture; under 18° belt cord angle B, the tire is difficult to manufacture for other reasons; and a 25° belt cord angle B gives good tire performance, good treadwear and high separation resistance. The reason for having belt cord angle B lower than carcass cord angle C is to get belt 18 to act as a restrictor on both carcass 12 and tread 10. The natural tendency of the tire is to form a tire shape coordinate with the cord path. The belt cord angle must be less than the carcass cord angle because, as the cord angle goes down, the tire has a flatter tread so belt 18 acts as a restrictor for the crown of tire carcass 12 if belt 18 has a lower cord angle than the rounder shape carcass 12 having higher cord angle C. If belt cord angle B exceeds 35°, the belt 18 is too round in the tire crown under tread 20 and provides insufficient restriction; belt 18 then becomes round like carcass 12 instead of flat like tread 10 so as not to provide the desired restriction. It should be apparent from FIG. 3 that belt cords 18a in adjacent belt plies 18p1 and 18p2 have different cord angles B relative to centerline CL and are oppositely and symmetrically inclined relative to centerline CL. Also, carcass cord 14a angle C in adjacent carcass plies 14p1 and 14p2 are also oppositely and symmetrically inclined relative to tire centerline CL.

The drawings specifically disclose two carcass plies 14p1 and 14p2, hereinafter generically referred to as carcass plies 14p; two belt plies 18p1 and 18p2, hereinafter generically referred to as belt plies 18p; and carcass plies 14p superimposed on each other and surrounded by two superimposed belt plies 18p in bias-belted tire 10. However, it should be readily apparent that this invention relates to all types of bias-belted tires, even though only bias-belted tire 10 is illustrated and described herein as an example. Therefore, when bias-belted tire 10 is referred to herein, the description and drawings are intended to include within their scope all operative variations of the illustrated structure including: (1) in carcass cord layer 14, any suitable number of carcass plies 14p; and (2) in belt 18, any suitable number of belt plies 18p, such as one, two (as shown), three or more belt plies 18p; any number of belt plies 18p arranged above (outside) the carcass plies 14p as shown, or arranged below, between, some between and some above or some below, or sandwiched around (above and below) carcass plies 14p. However, the illustrated two carcass ply 14p and two belt ply 18p construction in bias-belted tire 10 is the preferred construction herein.

Polyester carcass cords 14a and fiberglass belt cords 18a are preferred in bias-belted tire 10 for numerous reasons. Polyester is preferred: (1) over nylon for its high speed impact resistance, better uniformity and stability, low noise level and good treadwear and damping, and no flatspotting; and (2) over rayon for its better strength, uniformity, and durability; softer ride; lower rolling resistance; and better high speed and fatigue characteristics. Fiberglass is a preferred belt cord because of its high impact strength, compression modulus and stiffness; very high dynamic modulus; and low growth and creep.

It has been found that the performance of a bias-belted tire, such as tire 10, is a function of the combination of ingredients herein expressed by the following equation or formula:

$$C = F_1 + F_2$$

wherein:
$C$ = Combination of Ingredients Resultant in tire 10.
$F_1$ = Restriction-Performance Factor.
$F_2$ = Ride Factor.

If different physical characteristics of ply cords 14a and 18a in tire 10 are substituted for the $F_1$ and $F_2$ factors, the Combination of Ingredients formula becomes:

$$C = K_1 \left[ \frac{M_B \times T_B}{Gr_B} \right] \left[ \frac{M_C \times T_C}{Gr_C} \right] + K_2 \left[ \frac{T_B}{Ga_B} \right] \left[ \frac{T_C}{Ga_C \times FSI_C} \right]$$

wherein the above factors are defined as follows with (1) the measurement quantities of each given in the first parentheses and (2) the test number for each given in the second parentheses from the 1968 Book of American Society for Testing and Materials (ASTM), Part 24, entitles "Textile Materials—Yarns, Fabrics and General Methods":

$FSI_C$ = flatspotting index of carcass tire cords, 14a, (dimensionless). For explanation on determining this flatspotting index, see Grover W. Rye U.S. Pat. No. 3,280,617 granted October 25, 1966, and see article entitled, "How to Predict Flatspotting", by G. W. Rye and J. E. Martin, on pages 75–78 in October 1963 "Rubber World".
$Ga_B$ = Cord gauge of belt cord 18a,* (inches) (ASTM–D 885-13).
$Ga_C$ = Cord gauge of carcass cord 14a,* (inches) (ASTM–D 885-13).
$Gr_B$ = Growth of belt cord 18a* expressed as final length divided by original length, (a dimensional ratio) (ASTM–D 885.14.1).

$Gr_C$ = Growth of carcass cord 14a* expressed as final length divided by original length, (a dimensional ratio) (ASTM-D 885-14.1).
$K_1$ = 1×10⁻⁵ as a dimensional constant, (grams/denier)⁻⁴.
$K_2$ = 1×10⁻⁵ as a dimensional constant, (grams/denier-inch)⁻².
$M_B$ = Initial modulus# of belt cords 18a,* (grams/denier).
$M_C$ = Initial modulus# of carcass cords 14a,* (grams/denier).
$T_B$ = Tenacity of belt cords 18a,* (grams/denier).
$T_C$ = Tenacity of carcass cords 14a,* (grams/denier), which cords have been constructed to give satisfactory fatigue performance.

*cord tested is carcass cord 14a or belt cord 18a twisted to the specified amount and ready for assembly into tire 10 but prior to the final cord coating with rubber compound, with this cord herein being called "untreated cord". This cord tested is a free, single cord prior to calendering of the cord, but has desired twist, filament count, size and coating, etc., characteristics identical to cord as it will be put in the finished tire.
initial modulus is measured at origin or "O" lbs. point on stress-strain curve; this is the tangent to the curve at the "0" point.
Denier = weight in grams/9000 meters of yarn.

It has been found in practice that: (1) this formula is valid for all types of material in cords 14a and 18a, and (2) the higher the Combination of Ingredients factor C, the better the performance of bias-belted tire 10. Satisfactory bias-belted tires of this invention, especially in passenger car tires (defined as having a maximum inflation pressure of less than 40 p.s.i.), have a Combination of Ingredients index C at least above 10, and preferably above 16.0, and preferably having the minimum cured rivet given in the next paragraph.

In belt 18, it has been found that the minimum cured rivet Ta for belt cord filaments having modulus $M_B$ greater than 300, such as fiberglass cords, is 0.008 inches while that for belt cord filaments having modulus $M_B$ less than 300, such as more conventional fibers (such as rayon, nylon, or polyester), is 0.004 inches. If merged fibers are used for belt cords 18a, this minimum rivet is the summation of the percentage of each these rivet dimensions with these percentages being the percentages of each material in a merged cord 18a. For example, a merged cord 18a of 75 percent fiberglass and 25 percent rayon has minimum rivet of 0.007 inches (75 percent × 0.008 + 25 percent × 0.004 = 0.007). This rivet Ta assures that there will be sufficient gauge of rubber compound between adjacent belt cords 18a in any one belt ply 18p for high modulus fiberglass cords 18a so that the shear forces that are set up can be absorbed or dissipated by the rubber compound in the ply coat that separates adjacent cords within belt 18.

It should be noted that this C formula gives the parameters required in carcass and belt ply fabrics to give a combination of ingredients to make a successful bias-belted tire; and applies not only to illustrated bias-belted tire 10 having only two belt plies 18p and only two carcass plies 14p but also to any bias-belted tire having more of any of these plies.

Here are typical calculations for bias-belted tire 10 having different material carcass cords 14a and belt cord 18a:

1.C for polyester carcass cords 14a and fiberglass belt cords 18a:

$$C = K_1 \left[\frac{M_B \times T_B}{Gr_B}\right]\left[\frac{M_C \times T_C}{Gr_C}\right] + K_2\left[\frac{T_B}{Ga_B}\right]\left[\frac{T_C}{Ga_C \times FSI_C}\right]$$

$$C = (10^{-5})\left[\frac{350 \times 8}{1.001}\right]\left[\frac{70 \times 7.5}{1.03}\right] + (10^{-5})\left[\frac{8}{0.028}\right]\left[\frac{7.5}{0.030 \times 0.30}\right]$$

$C = 14.3 + 2.4$ $C = 16.7$

2.C for polyester carcass cords 14a and steel wire belt cords 18a:

$$C = K_1 \left[\frac{M_B \times T_B}{Gr_B}\right]\left[\frac{M_C \times T_C}{Gr_C}\right] + K_2\left[\frac{T_B}{Ga_B}\right]\left[\frac{T_C}{Ga_C \times FSI_C}\right]$$

$$C = (10^{-5})\left[\frac{350 \times 3.8}{1.001}\right]\left[\frac{70 \times 7.5}{1.03}\right] + (10^{-5})\left[\frac{3.8}{0.014}\right]\left[\frac{7.5}{0.030 \times 0.30}\right]$$

$C = 6.8 + 2.3$ $C = 9.1$

Hence, steel wire belt cords 18a are not as good as fiberglass belt cords 18a. 3.C for nylon carcass cords 14a and fiberglass belt cords 18a:

$$C = K_1 \left[\frac{M_B \times T_B}{Gr_B}\right]\left[\frac{M_C \times T_C}{Gr_C}\right] + K_2\left[\frac{T_B}{Ga_B}\right]\left[\frac{T_C}{Ga_C \times FSI_C}\right]$$

$$C = (10^{-5})\left[\frac{350 \times 8}{1.001}\right]\left[\frac{40 \times 7.5}{1.08}\right] + (10^{-5})\left[\frac{8}{0.028}\right]\left[\frac{7.5}{0.031 \times 1.20}\right]$$

$C = 7.8 + 0.6$ $C = 8.4$

It has been found by tests that bias-belted tire 10 having polyester carcass cords 14a and fiberglass belt cords 18a gives 50 to 500 percent greater treadwear mileage than conventional bias-type tires while still obtaining the desired soft ride because this tire 10 emphasizes both restriction-performance factor $F_1$ of plies 14p and 18p and ride factor $F_2$ obtained by a good pantographing action of bias plies 14p. Bias-belted tire 10 represents an outstanding improvement in tires.

Combination of Ingredients formula C defines the relationship and the importance of the relative fabric and/or reinforcing components in the tire and their characteristics, and their effect on restriction-performance factor $F_1$ and ride factors $F_2$. This formula was derived from a numerical analysis, after considering the various problems encountered in tires, and does not necessarily include factors of lesser importance that still may have an effect on tire performance. The formula is intended only for bias-belted tires, such as tire 10, as will be set forth in more detail hereinafter.

Restriction-performance factor $F_1$ is important for numerous reasons given hereafter.

Restriction-performance factor $F_1$ includes initial modulus of belt cords 18a and carcass cords 14a as $M_B$ and $M_C$, growth of carcass cords 14a and belt cords 18a as $Gr_C$ and $Gr_B$, and tenacity $T_C$ and $T_B$ of carcass cords 14a and belt cords 18a. Although restriction is primarily provided by belt 18, restriction-performance factor $F_1$ is really a combination of the total tire structure—not only belt cords 18a but also carcass cords 14a.

Modulus $M_B$ of belt cords 18a is the major restriction factor affecting the restriction, performance and efficiency of tire 10. The higher the modulus and the greater the restriction, the more desirable the material for belt cords 18a.

A high carcass modulus $M_C$ affects the relative movement of carcass plies 14p and belt plies 18p and determines to a degree the relative stresses absorbed by carcass plies 14p and belt plies 18p at the junction of these plies 14p and 18p. Modulus $M_C$ of carcass cords 14a in bias carcass plies 14p is important for two reasons in the restriction factor. First, if modulus $M_C$ of carcass cords 14a is relatively high, stretch of carcass cords 14a is less, and thus carcass cords 14a are able to absorb more of the internal inflation pressure and road shock with the tire components operating more closely as a unit with their closeness of moduli, and belt cords 18a have to absorb consequently somewhat less of these forces. Hence, even weaker belt 18 could provide the same restriction factor as a stronger belt if tire 10 had a higher carcass modulus $M_C$. Second, if carcass cord modulus $M_C$ is relatively high, the relative amount of pantographing and movement between belt 18 and carcass plies 14p is minimized. Tenacity $T_C$ of carcass cords 14a determines the fatigue resistance of tire 10. Carcass cords 14a must also have been constructed to give satisfactory fatigue performance. It can be generally stated that, as twist in a cord increases, the fatigue resistance increases but the strength decreases in the cord. Conversely, as twist decreases, strength increases and fatigue resistance decreases.

High tenacities $T_B$ and $T_C$, respectively, of belt cords 18a and carcass cords 14a are desirable from performance and impact resistance standpoints. As to performance high tenacity determines the weight of respective cords 14a and 18a material in tire 10; and the higher the tenacity, the lower the weight and quantity or gauge of respective cords 14a and 18a in tire 10. From a tire performance standpoint, the lower the cord content, the thinner the overall tire and ply constructions, the less chance of cord and rubber separation in the tire, and the better the performance of tire 10. As to impact resistance, tenacity $T_B$ and $T_C$ determine the impact resistance and performance of respective cords 14a and 18a. High tenacity $T_B$ and $T_C$ is desirable to provide adequate impact strength in belt plies 18p and in carcass plies 14p with no loss in carcass cord 14a fatigue performance.

Growth $Gr_B$ and $Gr_C$, respectively, of belt cords 18a and carcass cords 14a are important in determining the size of the final tire structure, and hence the relative efficiency of restriction. In other words, excessive growth of either of these cords, and especially growth $Gr_B$ of belt cords 18a, will reduce effective restriction appreciably with corresponding loss in total tire properties and Restriction-Performance Factor $F_1$ to reduce the Combination of Ingredients Index C.

Ride Factor $F_2$ emphasizes tire aesthetics and is important for many reasons given hereafter.

Although the "soft ride" obtained by pantographing carcass cords 14a is generally similar in bias-belted tire 10 and a bias angle tire, the ride characteristics of bias-belted tire 10 are considerably different than either a radial ply tire or a bias angle tire. This results from the fact that the area of tire 10 capable of absorbing and/or transmitting the forces from the roadway to the wheel (on which tire 10 is mounted) are considerably more limited and respond quite differently than other types of tires.

Ride Factor $F_2$ includes tenacity $T_B$ and $T_C$ respectively of belt cords 18a and of carcass cords 14a, gauge $Ga_B$ and $Ga_C$ respectively of belt cords 18a and carcass cords 14a, and carcass cords 14a flatspotting index $FSI_C$.

Ride Factor $F_2$ has been split up into the contribution by belt 18 as $$\left[\frac{T_B}{Ga_B}\right]$$

and the contribution by carcass plies 14p as $$\left[\frac{T_C}{Ga_C \times FSI_C}\right]$$

Tenacity ($T_C$ and $T_B$) and gages ($Ga_C$ and $Ga_B$) of both carcass cords 14a and belt cords 18a are important. The lower the cord content of carcass cords 14a and belt cords 18a in tire 10, the softer the ride and the better the riding qualities and the higher Ride Factor $F_2$ of that tire 10. Hence, Ride Factor $F_2$ is improved by lowering the cord content in tire 10 by having: (1) high cord tenacity $T_C$ and $T_B$ respectively of carcass cords 14a and belt cords 18a (the higher the tenacity or strength of each of these cords 14a and 18a, the lower the content of these cords in tire 10), (2) low cord gage $Ga_C$ and $Ga_B$ respectively of carcass cords 14a and belt cords 18a. (These gages determine the thickness of carcass plies 14p and belt plies 18p).

Carcass cord gage $Ga_C$ of carcass cords 14a is important because it controls, along with their carcass or bias cord angle C and/or rubber compound characteristics, the total stiffness of sidewalls 13 of tire 10. The thinner the carcass cords 14a, the better the overall absorption characteristics of these cords 14a, and the better the ride.

Flatspotting index $FSI_C$ of carcass tire cords 14a is a measurement of the response of carcass tire cords 14a under change in load. As this flatspotting index $FSI_C$ increases, the tendency to develop flat spots increases and Ride Factor $F_2$ decreases. While a flat spot occurs, rotation of the tire will cause a flat spot induced vibration to be transmitted to the tire-supported vehicle. Polyester has a low flat spot index, has almost a 100 percent strain recovery, and is rather inert so will give a low flatspotting index $FSI_C$ and a good Ride Factor $F_2$.

This Combination of Ingredients Resultant Index C formula is intended to be used only for bias-belted tires 10, and not for bias ply tires or radial ply tires, for several reasons. First, bias-belted tire 10 is really a composite tire having many of the various factors of a bias ply and a belted-type radial ply tire; and this formula is a method or form of relating, or summarizing, the important characteristics of only the combination or composite tire. Second, each factor $F_1$ or $F_2$ applies to only one of these prior art tires. The restriction aspects of Restriction-performance Factor $F_1$ in general would cover either a radial ply or a belted-bias tire, but Ride Factor $F_2$ does not cover a radial ply tire; also, Ride Factor $F_2$ applies to both a bias ply and a belted-bias tire, but the restriction aspects of Restriction-performance Factor $F_1$ does not apply to a bias ply tire. Third, a radial tire does not have the pantographing action and absorption techniques of the bias ply 14 sidewalls 13, has somewhat floppy sidewalls not really intended to support much weight since the radial ply belt carries the weight, has noncritical sidewall materials, and is not too concerned about the cord gauge or flatspotting index of the carcass cords found in Ride Factor $F_2$. The carcass cords in a radial tire do not go into compression, and flatspotting of tire carcass cords is only encountered where there is an alternate tension-compression or relaxation cycle. Flatspotting affects the ride of any tire only if a flat spot actually develops and if there is a transmission of the flat spot vibration to the wheel mounting that tire; neither of these conditions occurs in a radial ply tire. Also, a stronger flat spot tendency exists if a complete alternate tension-compression cycle of cords occurs while a radial tire has only alternate tension-relaxation cycle. Fourth, a bias ply tire has no belt 18 to provide the restriction aspect in Restriction-performance Factor $F_1$.

Now it should be apparent that this formula C provides a true measure of the improved treadwear, traction, high speed performance, durability, cool running, bruise resistance, ride, stability handling, cornering, road holding, and low rolling resistance found only in bias-belted tire 10, and that polyester carcass cords 14a combined with fiberglass belt cords 18a provides superior bias-belted tire 10.

A high Combination of Ingredients Resultant Index C generally requires a high modulus and relatively inextensible belt cord 18a. Such material is continuous extruded, filamentary fiberglass.

This invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are, therefore intended to be embraced therein.

We claim:

1. A bias-belted tire, comprising:
spaced tire beads;
a carcass connecting said beads;
a ground engaging tread on said carcass;
said carcass including at least two bias plies extending from bead to bead;
a circumferential belt in said carcass beneath said tread;
said belt comprising a plurality of superimposed belt plies;
each belt ply and each bias ply having respectively substantially parallel belt cords and carcass cords defining respectively a belt cord angle and carcass cord angle relative to the centerline of the tire;
the cords in adjacent belt plies and in adjacent bias plies having different cord angles relative to the tire centerline; and
said tire having a Combination of Ingredients index above 10 in the following formula:

$$K_1\left[\frac{M_B \times T_B}{Gr_B}\right]\left[\frac{M_C \times T_C}{Gr_C}\right] + K_2\left[\frac{T_B}{Ga_B}\right]\left[\frac{T_C}{Ga_C \times FSI_C}\right]$$

$FSI_C$ = Flatspotting index of the carcass tire cords.
$Ga_B$ = Cord gauge of the belt cords.*
$Ga_C$ = Cord gauge of the carcass cord.*
$Gr_B$ = growth of the belt cord* expressed as final length divided by orginal length.
$Gr_C$ = Growth of the carcass cord* expressed as final length divided by original length.
$K_1 = 1 \times 10^{-5}$.
$K_2 = 1 \times 10^{-5}$.
$M_B$ = Initial modulus of the belt cords.*
$M_C$ = Initial modulus of the carcass cords.*
$T_B$ = Tenacity of the belt cords,* and
$T_C$ = Tenacity of the carcass cords,* which carcass cords have been constructed to give satisfactory fatigue performance.
wherein:
*each of the above-identified cords is an untreated cord.

2. A bias-belted tire, as set forth in claim 1, with said Combination of Ingredients Index being above 16.0.

3. A bias-belted tire, as set forth in claim 1, with said bias-belted tire being a passenger car tire having a maximum inflation pressure less than 40 p.s.i.

4. A bias-belted tire, as set forth in claim 1, with the cured rivet between said belt cords being no less than 0.008 inch when $M_B$ is greater than 300 grams per denier.

5. A bias-belted tire, as set forth in claim 1, with the cured rivet between said belt cords being no less than 0.004 inch when $M_B$ is less than 300 grams per denier.

6. A bias-belted tire, as set forth in claim 1, with the cured rivet between said belt cords when merged filament cords being the summation of the percentage of 0.008 inch for the filaments having an $M_B$ greater than 300 grams per denier and of 0.004 inch for filaments having an $M_B$ less than 300 grams per denier with these percentages being determined by the percentages of each filament in said merged filament cord.

7. A bias-belted tire, as set forth in claim 1, with said belt consisting of only two belt plies.

8. A bias-belted tire, as set forth in claim 7, with said bias plies consisting of only two bias plies.

9. A bias-belted tire, as set forth in claim 1, with said belt cords comprising fiberglass filaments and said carcass cords comprising polyester filaments.

10. A bias-belted tire, as set forth in claim 1, with said belt cords consisting of fiberglass filaments and said carcass cords consisting of polyester filaments.

11. A tire, as set forth in claim 1, with the carcass cord angle being in adjacent bias plies oppositely and symmetrically inclined relative to the tire centerline, the belt cord angle being in adjacent belt plies oppositely and symmetrically inclined relative to the tire centerline, the carcass cord angle being at least 5° greater than the belt cord angle.

12. A tire, as set forth in claim 11, with said belt cord angle being between 5° and 35°.

13. A tire, as set forth in claim 11, with said belt cord angle being between 10° and 30°.

14. A tire, as set forth in claim 11, with said belt cord angle being between 18° and 28°.

15. A tire, as set forth in claim 11, with said carcass cord angle being between 25° and 45°.

16. A tire, as set forth in claim 15, with said belt cord angle being between 18° and 28°.

17. A tire, as set forth in claim 16, with each of said bias plies having generally parallel carcass cords of polyester filaments, each of said belt plies having generally parallel belt cords comprising fiberglass filaments.